(12) United States Patent
Yamazaki (10) Patent No.: US 7,417,814 B2
(45) Date of Patent: Aug. 26, 2008

(54) MAGNETIC RECORDING DEVICE

(75) Inventor: Yuichiro Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 11/197,493

(22) Filed: Aug. 5, 2005

(65) Prior Publication Data
US 2006/0209443 A1    Sep. 21, 2006

(30) Foreign Application Priority Data
Mar. 18, 2005   (JP)   ............... 2005-080603

(51) Int. Cl.
G11B 27/36   (2006.01)
G11B 5/09    (2006.01)
G11C 29/00   (2006.01)

(52) U.S. Cl. ............... 360/31; 360/53; 714/718; 714/719; 714/720

(58) Field of Classification Search ............... None
See application file for complete search history.

(56) References Cited

U.S. PATENT DOCUMENTS 4,881,136 A * 11/1989 Shiraishi et al. ............ 360/25
6,151,180 A   11/2000 Bang
6,292,913 B1 * 9/2001 Son ........................... 714/718

* cited by examiner

Primary Examiner—Andrea Wellington
Assistant Examiner—Dan I Davidson
(74) Attorney, Agent, or Firm—Kratz, Quintos & Hanson, LLP (57) ABSTRACT

A magnetic recording device comprising a magnetic recording medium, a read-write channel for modulating write data, writing it on the magnetic recording medium, reading data from the magnetic recording medium, and demodulating the read data, and a processor for supplying the write data to the read-write channel and being supplied with the read data from the read-write channel. The processor supplies to the read-write channel a microdefect detection pattern having a first pattern for generating a consecutive magnetization inversion during writing and a second pattern for generating, during reading, a signal having a S/N ratio higher than the signal produced by the first pattern, the read-write channel modulates the microdefect detection pattern, writes it to the magnetic recording medium, reads the microdefect detection pattern, which was written, from the magnetic recording medium, and conducts abnormality detection of the microdefect detection pattern, which was read out.

18 Claims, 10 Drawing Sheets

| WRITE DATA WD | 1 | 1 | 1 | 1 | 1 | 1 | 0 | 1 | 0 | 1 |
|---|---|---|---|---|---|---|---|---|---|---|
| MODULATED DATA MD | 0 1 | 0 1 | 0 1 | 0 1 | 0 1 | 0 1 | 0 0 | 0 1 | 0 0 | 0 1 |
| DIRECTION OF MAGNETIZATION | → | ← | → | ← | → | ← | → | ← | | |

| WRITE DATA WD | 0 | 0 | 0 | 0 | 0 | 1 | 0 | 1 | 0 | 1 |
|---|---|---|---|---|---|---|---|---|---|---|
| MODULATED DATA MD | 0 0 | 1 0 | 1 0 | 1 0 | 1 0 | 0 1 | 0 0 | 0 1 | 0 0 | 0 1 |
| DIRECTION OF MAGNETIZATION | | → | ← | → | ← | → | ← | | | → ← |

FIG. 6

| PARAMETER | DETECTION SENSITIVITY | | | |
|---|---|---|---|---|
| | LEVEL 1 | LEVEL 2 (LOW SENSITIVITY) | LEVEL 3 | LEVEL 4 (HIGH SENSITIVITY) |
| WRITE CURRENT Iw | USUAL WRITE VALUE | -5% | -10% | -15% |
| OVERSHOOT Os | USUAL WRITE VALUE | -5% | -10% | -15% |

FIG. 7

| PARAMETER | DETECTION SENSITIVITY | | | |
|---|---|---|---|---|
| | LEVEL 1 | LEVEL 2 (LOW SENSITIVITY) | LEVEL 3 | LEVEL 4 (HIGH SENSITIVITY) |
| CUTOFF FREQUENCY Fc | USUAL WRITE VALUE | -5% | -10% | -15% |
| BOOST Bs | USUAL WRITE VALUE | -5% | -10% | -15% |

| | A | B | C | D | E |
|---|---|---|---|---|---|
| FIRST WRITE | 0101010101 | 0100010001 | 0101010101 | 0100010001 | 0101010101 |
| SECOND WRITE | 0100010001 | 0101010101 | 0100010001 | 0101010101 | 0100010001 |

FIG. 11

MAGNETIC RECORDING DEVICE

CROSS-REFERENCE TO RELATED APPLICATIONS

This application is based upon and claims the benefit of priority from the prior Japanese Patent Application No. 2005-80603, filed on Mar. 18, 2005, the entire contents of which are incorporated herein by reference.

BACKGROUND OF THE INVENTION

1. Field of the Invention

The present invention relates to a magnetic recording device for detecting microdefects in magnetic recording media.

2. Description of Prior Art

Magnetic recording devices are designed to record and reproduce information by rotating a magnetic disk composed of a ferromagnetic material and causing a magnetic head to scan over the magnetic disk and are generally used as auxiliary storage devices in computers.

With respect to data areas of magnetic recording medium of the magnetic recording devices, detection processing of defects is conducted during shipping from the production plant. The defect as referred to herein means the presence of scratches, contaminants, or particles on the surface of the magnetic storage medium. In the zones where defects are present, the degree of magnetization during writing is reduced and writing or reading is made difficult. The design is that the defect zone discovered in detection processing of defects during shipping from the production plant will be skip registered in the memory area of the processor that controls the magnetic recording device.

In the delivered magnetic recording devices, the zones where data is difficult to read or write during reading and writing of data are also skip registered. As a result, with respect to the defects that appeared after the delivery, the destruction of data that will be written into the zones of such defects can be prevented in advance.

Methods for writing and reading the usual data are considered as the conventional defect detection methods. Thus, the presence of defects can be detected by writing and reading the usual data and observing changes in the amplitude or phase of the signals that were read out.

Figure 1:
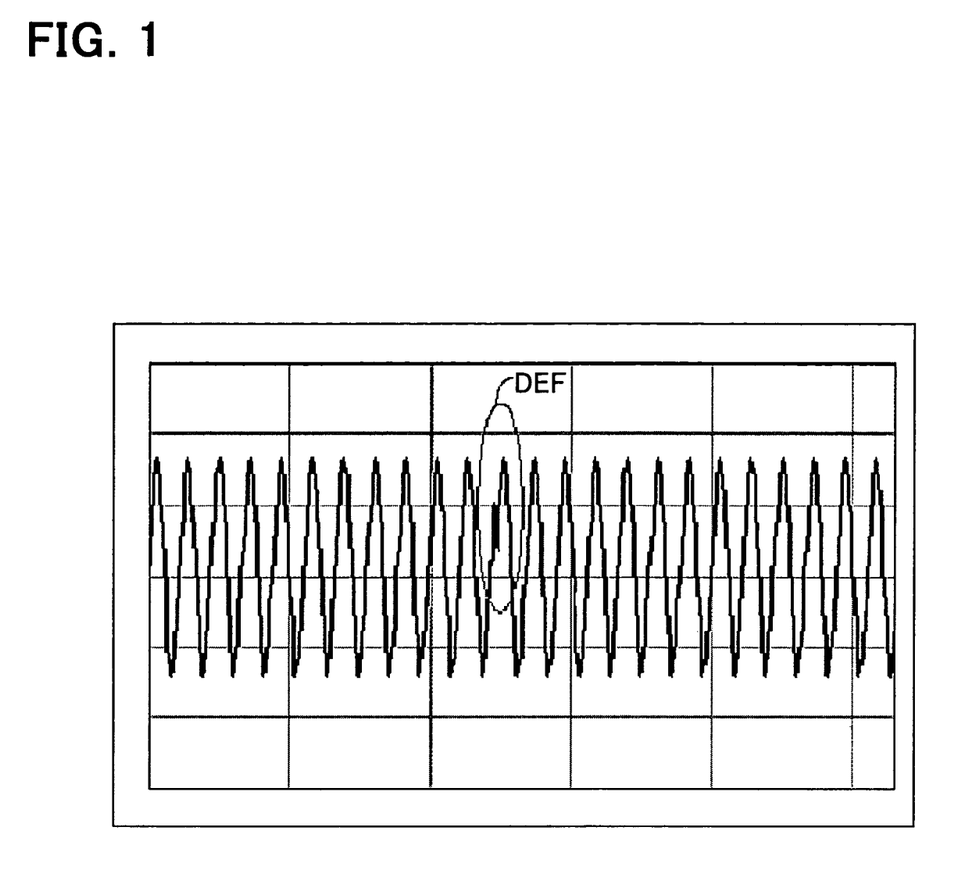
FIG. 1 illustrates a signal that was read out during defect detection by the usual data writing and reading.

FIG. 1 shows a signal that was read out during defect detection by writing and reading the usual data. In the zone DEF where a defect is present, the signal becomes discontinuous or the phase and amplitude change significantly. Detecting this zone makes it possible to detect the defect location.

Further, when the usual data is written or read, the data pattern is randomized, repetitions of "0" and "1" are restricted, and bit inversions that continue for a long time are rare.

Here, randomization is a processing conducted to eliminate the regularity of the write data. For example, a pattern with a repeating magnetization inversion, such that the data recorded on a medium is "1", "1", "1", "1", has a poor S/N ratio and a high error rate. Therefore, it is preferred that the occurrence thereof be reduced to a minimum. Accordingly, in the usual data writing, the processing for eliminating the regularity is conducted by using a scrambler.

Figure 2:
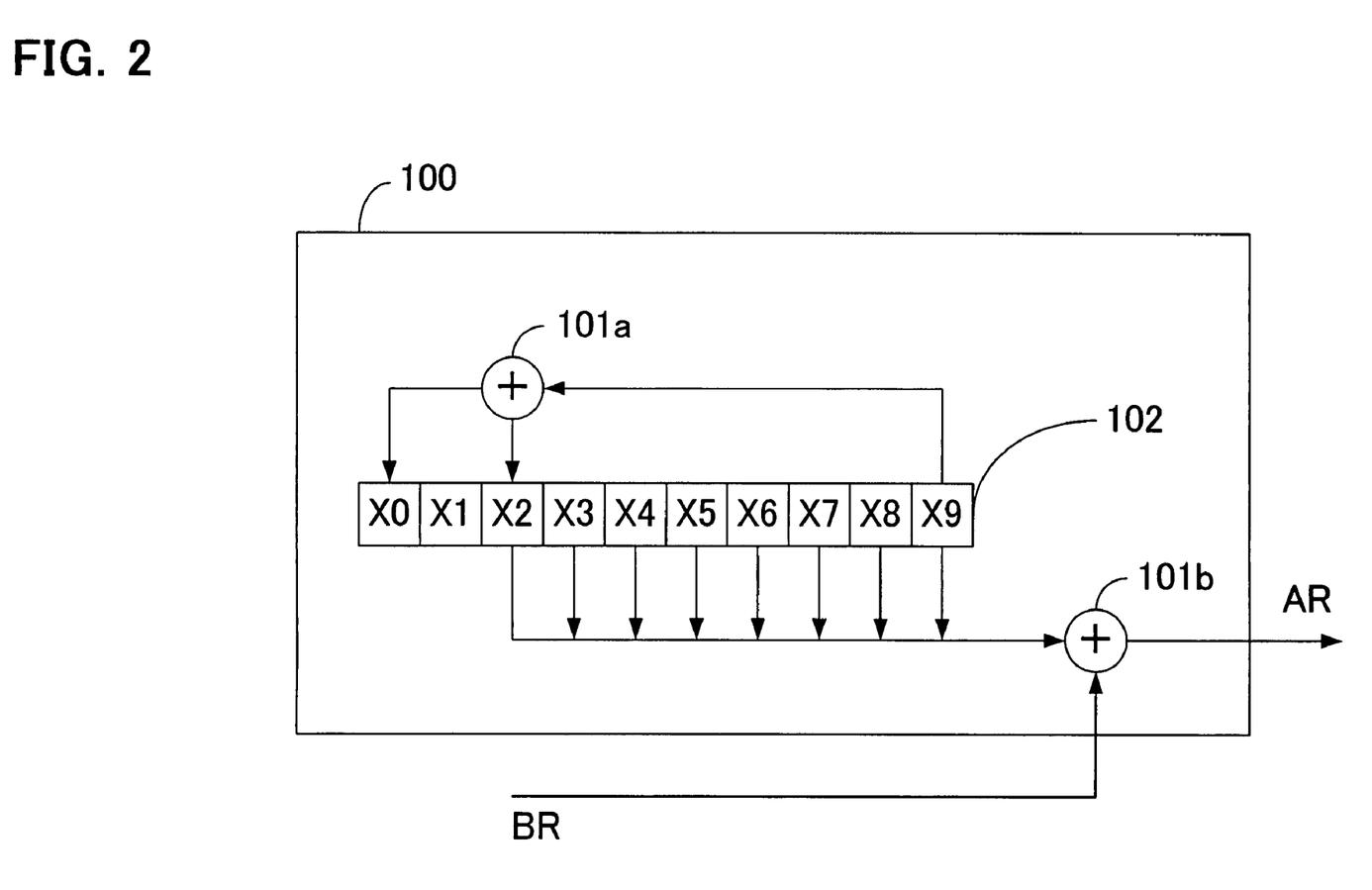
FIG. 2 shows an examples of a scrambler for conducting randomization.

FIG. 2 is an example of a scrambler for conducting randomization. A scrambler 100 comprises two exclusive OR (hereinbelow, ExOR) circuits 101a, 101b and a 10 bit shift register 102. Data X9-X0 stored in the shift register 102 are successively shifted from X0 to X9, the value of X9 and the value of X2 are inputted in the ExOR circuit 101a, and the output thereof is inputted as X0 in the shift register 102. Data BR prior to randomization is 8 bit parallel data; it is inputted in the ExOR circuit 101b together with the 8 bit data X2-X9 located in the shift register and is outputted as data AR after randomization from the scrambler 100. The scrambler 100 uses a 10 bit shift register 102 and, therefore, has a 1024 byte periodicity.

The technology described in Japanese Patent Application Laid-open No. H11-328877 represents a circuit for detecting defects in magnetic recording devices. With this technology, defect detection in a magnetic recording device is conducted by using usual data writing and reading.

However, all the defects are difficult to detect with the defect detection based on the usual data writing and reading. With the defect detection function provided in the conventional magnetic recording devices, the defects include microdefects that cannot be detected as rapid changes of phase or amplitude. Usually those microdefects in most cases can be repaired by an error correction function. However, the problem is that in the case where those microdefects have grown and increased in size, for example, due to changes in characteristics of head medium, the data discrimination capability of the location thereof is reduced, error correction capability is exceeded, and data restoration is impossible.

SUMMARY OF THE INVENTION

Accordingly, it is an object of the present invention to detect microdefects present on a magnetic storage medium in a magnetic recording device.

In order to resolve the above-described problems, in accordance with the first aspect of the present invention, there is provided a magnetic recording device comprising a magnetic recording medium, a read-write channel for modulating write data, writing it on the magnetic recording medium, reading data from the magnetic recording medium, and demodulating the read data, and a processor for supplying the write data to the read-write channel and being supplied with the read data from the read-write channel, wherein the processor supplies to the read-write channel a microdefect detection pattern having a first pattern for generating a consecutive magnetization inversion during writing and a second pattern for generating, during reading, a signal having a S/N ratio higher than the signal produced by the first pattern, the read-write channel modulates the microdefect detection pattern, writes it to the magnetic recording medium, reads the microdefect detection pattern, which was written, from the magnetic recording medium, conducts abnormality detection of a signal corresponding to the microdefect detection pattern, which was read out, and notifies the abnormality detection position on the magnetic recording medium to the processor when the abnormality was detected, and the processor registers the abnormality detection position, which was notified, as an unusable region.

In the first aspect of the present invention, in the preferred embodiment thereof, the microdefect detection pattern is written again with a phase shift on the same location on the magnetic recording medium.

In the first aspect of the present invention, in the further preferred embodiment thereof, the processor weakens the degree of magnetization of the write section of the magnetic recording medium by adjusting a parameter of a write system of the read-write channel when the microdefect detection pattern is written.

In the first aspect of the present invention, in the further preferred embodiment thereof, the parameter of the write system is a write current.

In the first aspect of the present invention, in the further preferred embodiment thereof, the parameter of the write system is a write current overshoot.

In the first aspect of the present invention, in the further preferred embodiment thereof, the processor lowers the frequency characteristic of the read-write channel by adjusting a parameter of a read system of the read-write channel when the microdefect detection pattern is read.

In the first aspect of the present invention, in the further preferred embodiment thereof, the parameter of the read system is a cutoff frequency.

In the first aspect of the present invention, in the further preferred embodiment thereof, the parameter of the read system is a boost.

In the first aspect of the present invention, in the further preferred embodiment thereof, writing and reading of the microdefect detection pattern is carried out during a retry based on an error detection during reading or writing the usual data.

In the first aspect of the present invention, in the further preferred embodiment thereof, writing and reading of the microdefect detection pattern are carried out periodically.

In accordance with the second aspect of the present invention, there is provided a microdefect detection method in a magnetic recording device comprising a magnetic recording medium, a read-write channel for modulating write data, writing it on the magnetic recording medium, reading data from the magnetic recording medium, and demodulating the read data, and a processor for supplying the write data to the read-write channel and being supplied with the read data from the read-write channel, the method comprising a write step of supplying a microdefect detection pattern having a first pattern for generating a consecutive magnetization inversion during writing and a second pattern for generating, during reading, a signal having a S/N ratio higher than the signal produced by the first pattern from the processor to the read-write channel, modulating the microdefect detection pattern, and writing it on the magnetic recording medium with the read-write channel, a read step of reading the microdefect detection pattern, which was written, from the magnetic recording medium with the read-write channel, a detection step of conducting abnormality detection of a signal corresponding to the microdefect detection pattern, which was read out, and notifying the abnormality detection position on the magnetic recording medium to the processor when the abnormality was detected with the read-write channel, and a registering step of registering with the processor the abnormality detection position, which was notified, as an unusable region.

In the second aspect of the present invention, in the preferred embodiment thereof, the microdefect detection pattern is written again with a phase shift on the same location on the magnetic recording medium.

In the second aspect of the present invention, in the further preferred embodiment thereof, the processor weakens the degree of magnetization of the write section of the magnetic recording medium by adjusting a parameter of a write system of the read-write channel in the write step.

In the second aspect of the present invention, in the further preferred embodiment thereof, the parameter of the write system is a write current.

In the second aspect of the present invention, in the further preferred embodiment thereof, the parameter of the write system is a write current overshoot.

In the second aspect of the present invention, in the further preferred embodiment thereof, the processor lowers the frequency characteristic of the read-write channel by adjusting a parameter of a read system of the read-write channel in the read step.

In the second aspect of the present invention, in the further preferred embodiment thereof, the parameter of the read system is a cutoff frequency.

In the second aspect of the present invention, in the further preferred embodiment thereof, the parameter of the read system is a boost.

With the magnetic recording device in accordance with the present invention, microdefects can be detected by writing onto a magnetic recording medium and then reading therefrom a microdefect detection pattern having a first pattern for generating a consecutive magnetization inversion during writing and a second pattern for generating, during reading, a signal having a S/N ratio higher than the signal produced by the first pattern. As a result, the microdefect location can be registered to an unusable area and the destruction of data can be prevented in advance before the microdefect increases in size and the error correction of stored data becomes impossible.

DESCRIPTION OF THE PREFERRED EMBODIMENTS

The embodiments of the present invention will be described below with reference to the drawings. However, the technological scope of the present invention is not limited to those embodiments and includes the features described in the claims and equivalents thereof.

Figure 3:
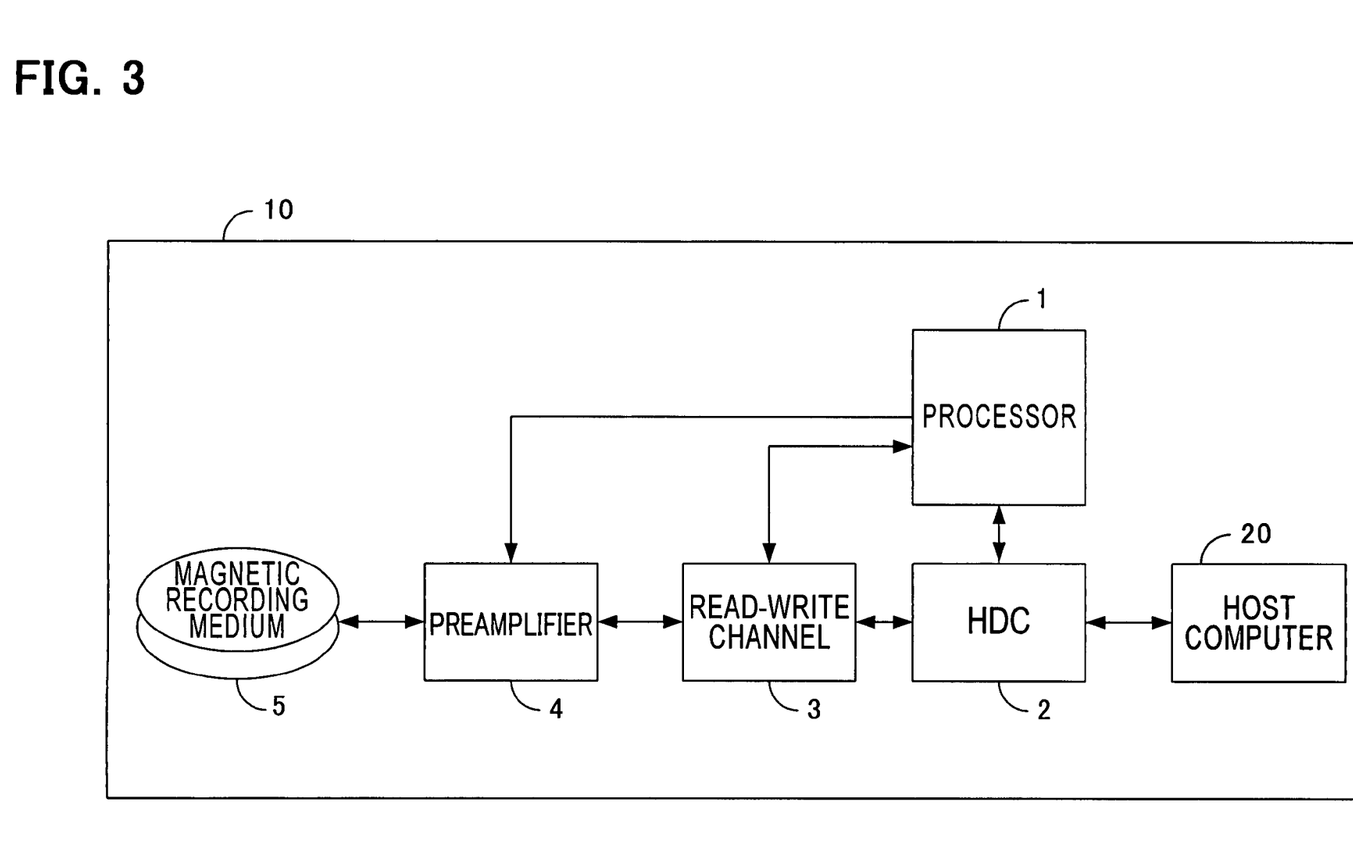
FIG. 3 is a block diagram of a magnetic recording device in an embodiment of the present invention.

FIG. 3 is a block diagram of a magnetic recording device of an embodiment of the present invention. A magnetic recording device 10 of this embodiment comprises a processor 1 for controlling the entire magnetic recording device, a hard disk controller (denoted by HDC in the figure) 2 having an error correction function etc., a read-write channel 3 having a defect detection function etc., a preamplifier 4 for amplifying write signals and read signals, and a magnetic storage medium 5 for data recording.

During usual data writing, write data and an address are received from a host computer 20 connected to the magnetic recording device 10, the hard disk controller 2 confirms the head position from the servo information located on the magnetic recording medium 5 and writes the write data on the target address via the hard disk controller 2, read-write channel 3, and preamplifier 4. At this time, an error correction code is added to the write data in the hard disk controller 2. Randomization for eliminating the regularity of data is also conducted in the hard disk controller 2.

Further, during usual data reading, the magnetic recording device 10 receives the address from the host computer 20, and the hard disk controller 2 confirms the head position from the servo information located on the magnetic recording medium 5 and reads the data located on the target address. The readout data signal is amplified in the preamplifier 4, defect detection is conducted in the read-write channel 3, and error correction is conducted in the hard disk controller 2 by using the error correction code that was added during writing.

Here, a microdefect detection pattern used for detecting microdefects will be explained. The microdefect detection pattern is composed of a first pattern, which is a pattern inducing a consecutive magnetization inversion during writing, and a second pattern for generating a signal having a S/N ratio higher than that of the signal produced by the first pattern during reading. The first pattern is data, for example, "1111" or "0000". Further, the second pattern is data, for example, "10101".

Figure 4:
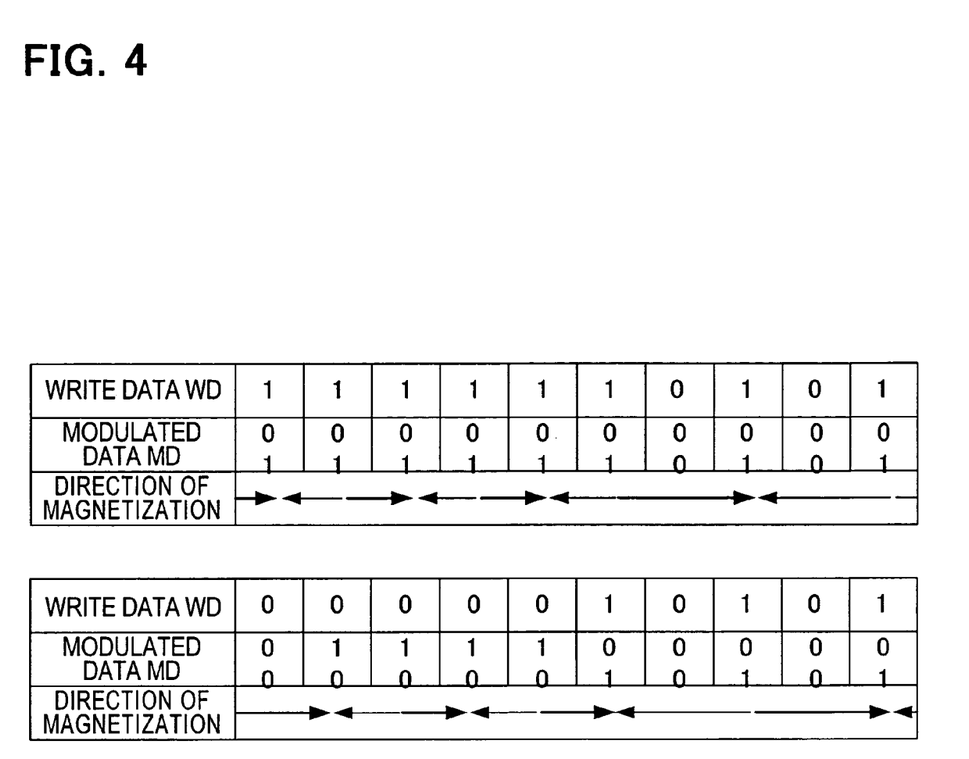
FIG. 4 illustrates the direction of magnetization and modulated data corresponding to write data.

FIG. 4 illustrates the direction of magnetization and modulated data corresponding to write data. Here, the explanation is provided by using a MFM (Modified Frequency Modulation) modulation system as an example. In the present embodiment, the explanation is provided by using a MFM modulation system, but other modulation systems can be also employed. In the MFM modulation system, as a rule, "1" of the write data WD is converted to "01" and "0" is converted to "00". However, "0" of the write data WD is converted to "10" when the immediately preceding data was "0". Correspondingly, the direction of magnetization that will be written is inverted each time "1" appears in the modulated data MD. Therefore, when "1111"' is written, the inversion of magnetization is induced consecutively for conversion to "01010101". Similarly, when "0000" is written, the inversion of magnetization is also induced consecutively for conversion to "00101010". Further, when the write data WD is "10101", it is converted to "0100010001". This modulation processing is carried out in the read-write channel 3.

The procedure of microdefect detection will be described below.

Figure 5:
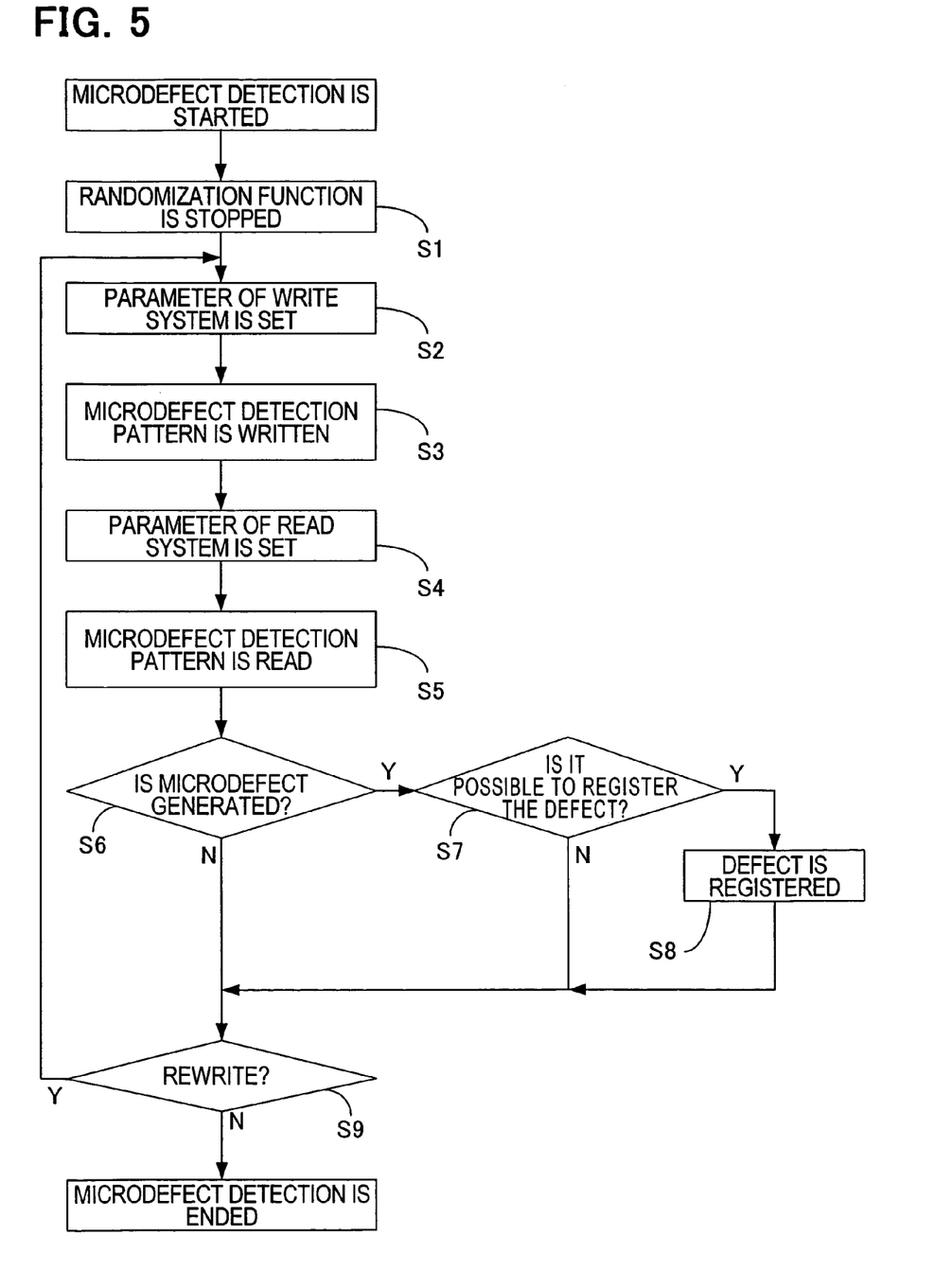
FIG. 5 is a flowchart relating to microdefect detection.

FIG. 5 is a flowchart of microdefect detection. If the microdefect detection is started, first, a randomization function in the hard disk controller 2 is terminated (step S1). The termination of the error correction function is conducted so that an error will not be restored when a defect is detected. It is also conducted to avoid adding an extra code to the write data by the error correction function. The termination of the randomization function is conducted to enable writing of the microdefect detection pattern that is used for microdefect detection. The microdefect detection pattern comprises patterns such as "1111" and "0000" for inducing consecutively the magnetization inversion, and those patterns are destroyed by the randomization function.

A parameter of the write system is then set (step S2).

Figure 6:
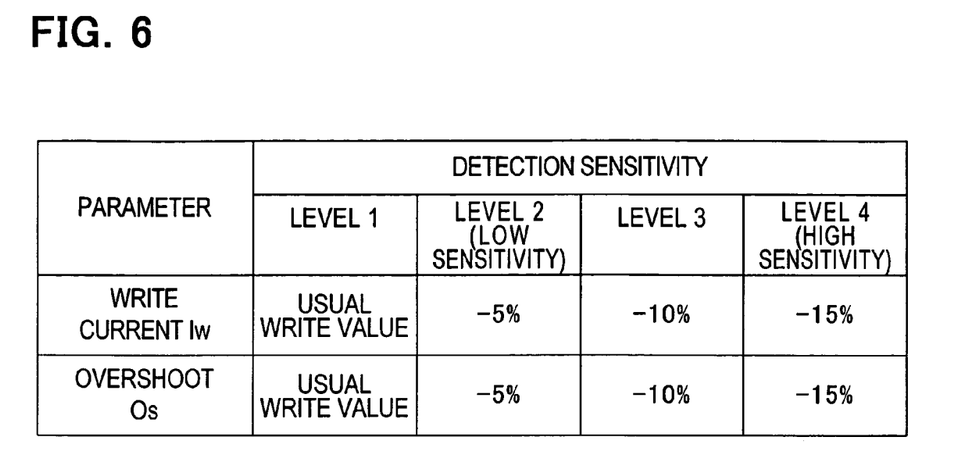
FIG. 6 is a table illustrating the setting of write system parameters.

FIG. 6 is a table illustrating the setting of the write system parameters. Here, the write system parameters are a write current Iw and a write current overshoot Os. If the write current Iw or write current overshoot Os are increased, the degree of magnetization in the magnetic storage medium is intensified. Conversely, setting those values lower than usual can weaken the degree of magnetization created by writing, decrease the writing capability, and facilitate the detection of microdefects during reading. The detection sensitivity that is set herein is determined in advance and the write system parameters vary according thereto.

The microdefect detection pattern is then written onto the magnetic recording medium 5 (step S3). The microdefect detection pattern is stored in the memory area in the processor 1 and written into the magnetic recording medium 5 via the hard disk controller 2, read-write channel 3, and preamplifier 4.

A parameter of the read system is thereafter set (step S4).

Figure 7:
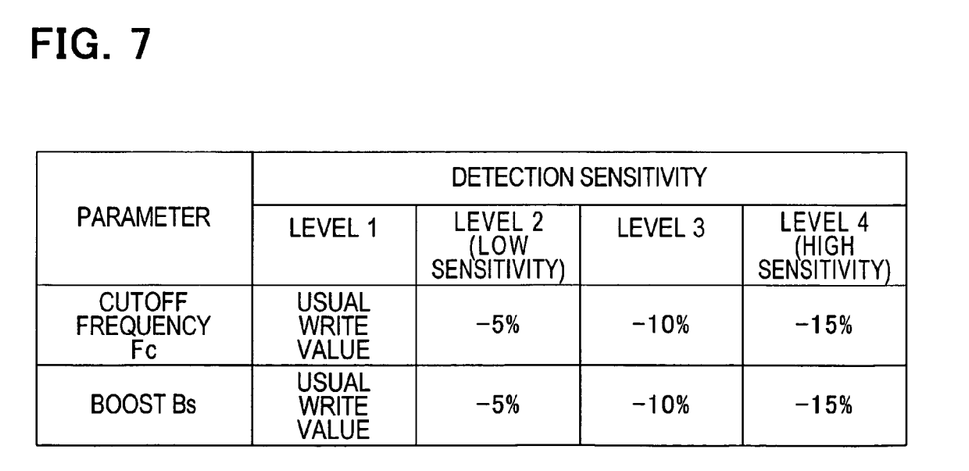
FIG. 7 is a table illustrating the setting of read system parameters.

FIG. 7 is a table illustrating the setting of read system parameters. Here, the read system parameters are a cutoff frequency Fc and a boost Bs. By setting low the cutoff frequency Fc or boost Bc and decreasing the frequency characteristic it is possible to decrease the read capability and facilitate the detection of microdefects during reading. The detection sensitivity that is set herein is determined in advance and the write system parameters vary according thereto.

The microdefect detection pattern, which was written, is then read (step 5).

Figure 8:
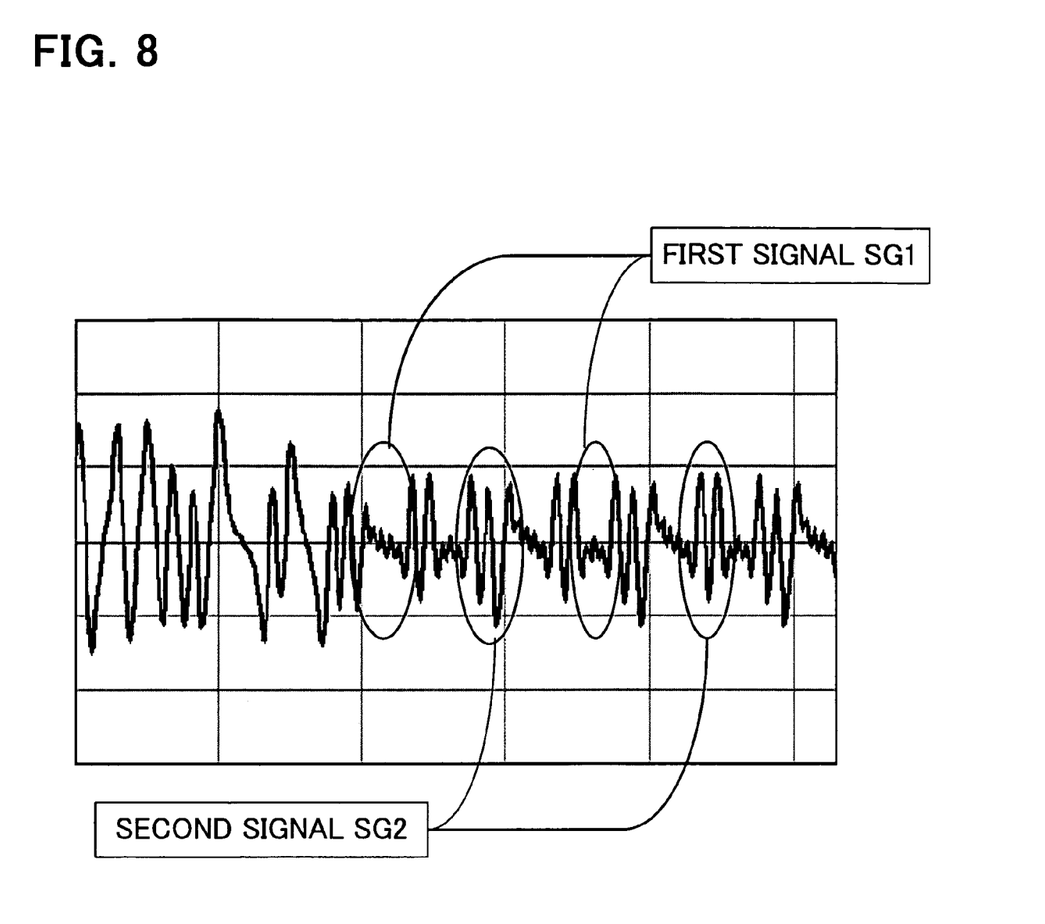
FIG. 8 shows a signal obtained when a microdefect detection pattern is read.

FIG. 8 shows a signal obtained when a microdefect detection pattern is read. The microdefect detection pattern is composed of a first pattern, which is a pattern inducing a consecutive magnetization inversion during writing, and a second pattern for generating a signal having a S/N ratio higher than that of the signal produced by the first pattern during reading. When the first pattern is read, a first signal SG1, which has a high frequency and a variable phase, is detected. Further, when the second pattern is read, a second signal SG2, which has a S/N ratio higher than that of the first signal SG1, is read.

When a microdefect is present, the phase and amplitude of the first signal SG1 change rapidly and the microdefect can be picked up by the defect detection function in the read-write channel 3. In addition, when a microdefect is present, it can be picked up by the defect detection function in the read-write channel 3 as a peak collapse at which the maximum value of the amplitude of the first signal SG1 decreases.

Figure 9:
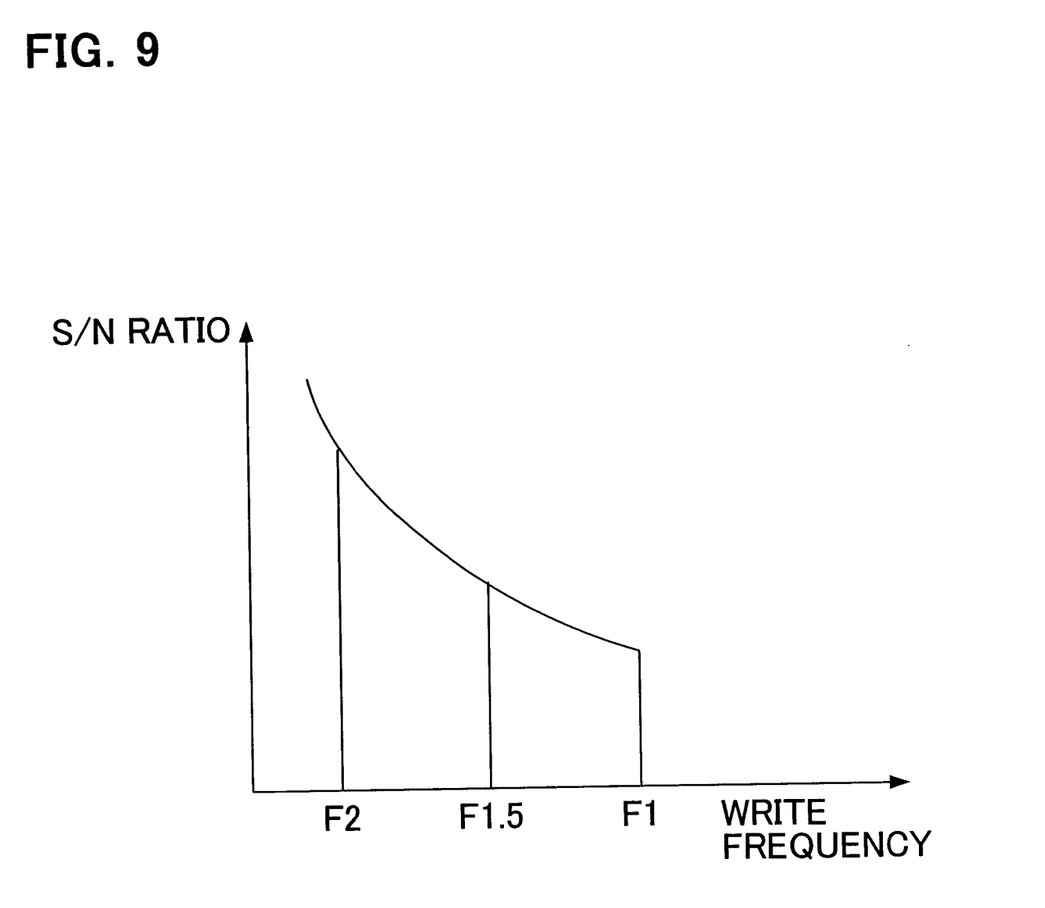
FIG. 9 illustrates the correspondence of the write frequency and S/N ratio.

FIG. 9 illustrates the correspondence of the write frequency and S/N ratio. The first pattern of microdefect detection pattern produces the first signal SG1, and the frequency thereof is a highest frequency F1 in the position where this signal is written. Further, the frequency of the second signal SG2 produced by the second pattern is the second highest frequency F2 in the write position. For the detection of microdefects, it is desirable that writing be conducted at the frequency F1, but if writing is continued at the frequency F1, the error rate increases due to a poor S/N ratio. Accordingly, the frequency is held at amount F1.5 shown in FIG. 6 and the error rate is reduced by admixing the second signal SG2.

After reading the microdefect detection pattern, which was written, the uncorrectable error caused by the rapid changes in phase and amplitude and a peak collapse is detected and it is judged as the presence of a microdefect (step S6). When a microdefect is judged to be present, a decision is made whether this microdefect can be registered (step S7). When a large number of defects are registered, there may be cases where registering is impossible. When the microdefect is judged to be registerable, information relating to the position of the microdefect is sent from the read-write channel 3 to the processor 1 and recorded in a memory area of the processor 1 (step S8). The recorded position on the magnetic recording medium 5 is avoided as an area where writing is impossible.

The rewriting judgment is made when microdefects were not generated in step S6, when registration of microdefects in step S7 is impossible, and after the microdefects have been registered in step S8 (step S9). The rewriting is a processing of writing the first pattern in a position where the second pattern was written in the previous writing cycle.

Figure 10:
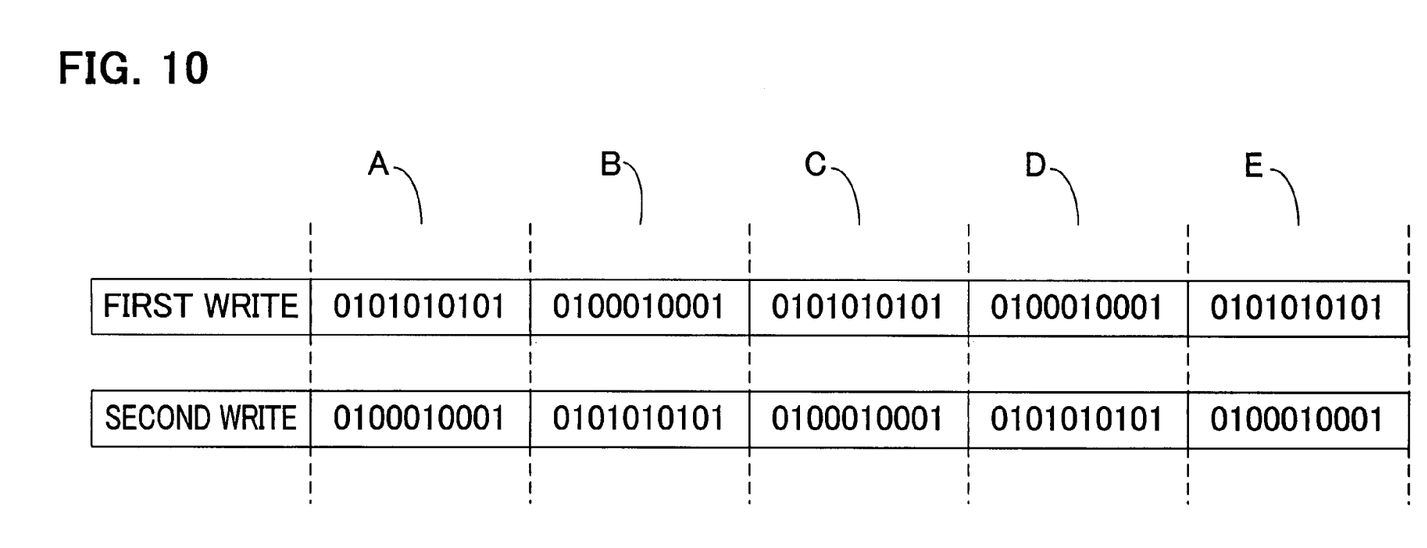
FIG. 10 shows an example of reading a microdefect detection pattern relating to a magnetic recording medium.

FIG. 10 shows an example of reading a microdefect detection pattern relating to a magnetic recording medium. In the first writing, the first pattern is written into the segments A, C, E and a second pattern is written into the segments B, D. Because the first pattern is more useful in microdefect detection than the second pattern, the first pattern has to be written into the segments B, D where the second pattern has been written in the first writing. Here, the first pattern can be written into the segment where the second pattern has been written in the first writing by conducting writing with a phase shift in the second writing.

When the second writing is not conducted in confirming the rewriting in step S9, the processing flow returns to step S2. Further, when the second writing ends, the detection of microdefects end. The sequence of operations including setting the write system parameters in the second writing (step S2), writing the microdefect detection pattern (step S3), setting the read system parameters (step S4), reading the microdefect detection pattern (step S5), confirming the microdefect generation (step S6), confirming the possibility of defect registering (step S7), and defect registering (step S8) is identical to that of the first writing, except the writing phase is shifted.

Figure 11:
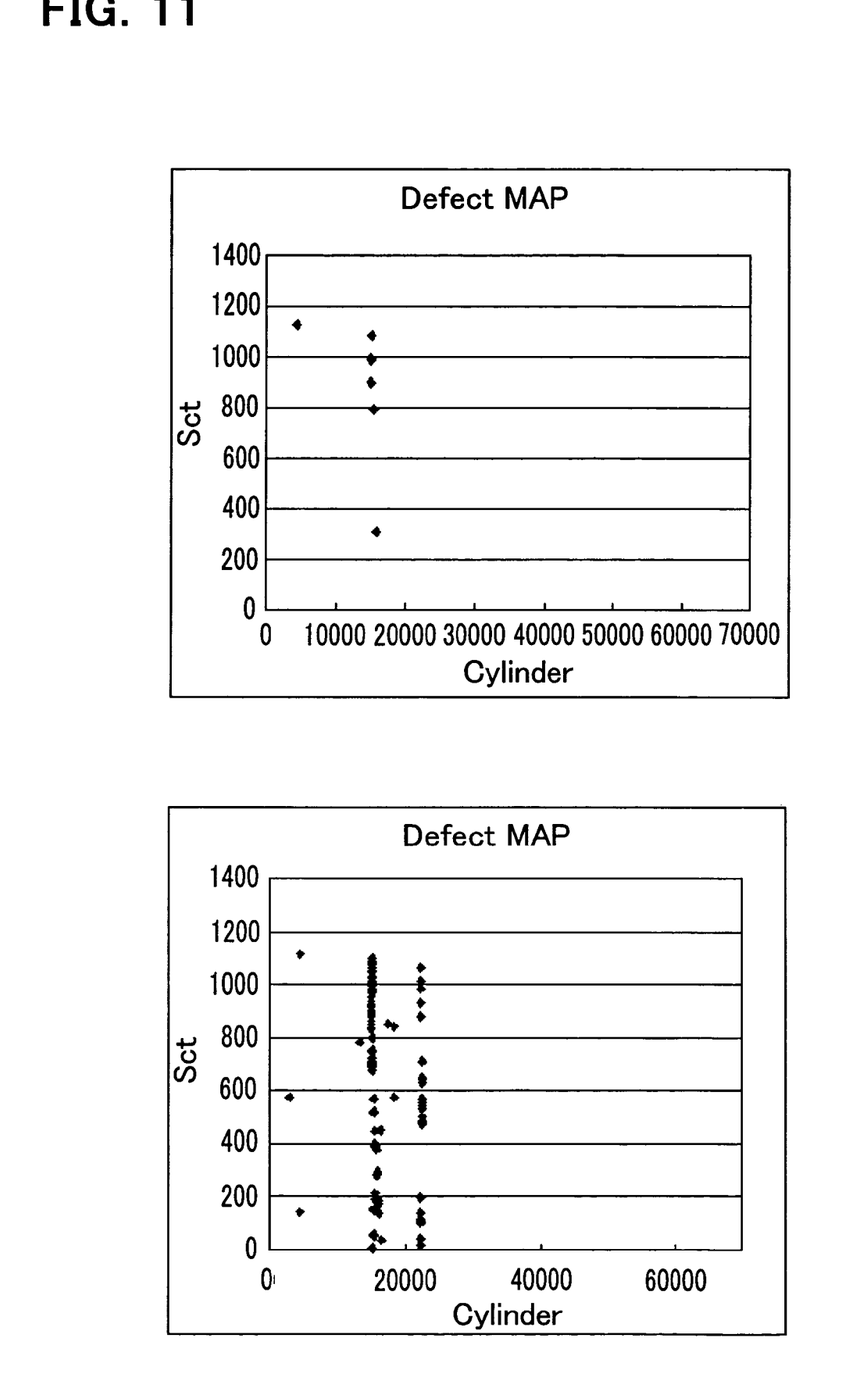
FIG. 11 is shows an example of a defect map detected by the usual data pattern and the microdefect detection pattern.

FIG. 11 shows an example of a defect map detected by the usual data pattern and microdefect detection pattern. The defect obtained by defect detection using the usual data pattern is shown in the upper part of the figure, and the defect map obtained by defect detection using the microdefect detection pattern is shown in the lower part of the figure. In both figures, the cylinder number is plotted against the abscissa and the sector number is plotted against the ordinate. In the usual data pattern, there are several detected defects, whereas the microdefect detection pattern includes the detected defects that are absent in the usual data pattern.

Thus, microdefects can be detected by writing on a magnetic recording medium and then reading therefrom a microdefect detection pattern having a first pattern for generating a consecutive magnetization inversion during writing and a second pattern for generating, during reading, a signal having a S/N ratio higher than the signal produced by the first pattern. As a result, the location of a microdefect can be registered in the unusable area and data destruction can be prevented in advance before the microdefect increases in size and error correction of the stored data becomes impossible.

In accordance with the present invention, microdefects in a magnetic recording medium in a magnetic recording device can be detected. As a result, the respective storage area can be exclusively registered and loss of important data can be prevented in advance before the microdefect increases in size and error correction becomes impossible.

What is claimed is:

1. A magnetic recording device comprising
a magnetic recording medium;
a read-write channel for modulating write data, writing it on said magnetic recording medium, reading data from said magnetic recording medium, and demodulating said read data; and
a processor for supplying said write data to said read-write channel and being supplied with said read data from said read-write channel, wherein
said processor supplies to said read-write channel a microdefect detection pattern having first pattern for generating a consecutive magnetization inversion during writing and a second pattern for generating, during reading, a signal having a S/N ratio higher than the signal produced by said first pattern;
said read-write channel modulates said microdefect detection pattern, writes it to said magnetic recording medium, reads said microdefect detection pattern, which was written, from said magnetic recording medium, conducts abnormality detection of a signal corresponding to said microdefect detection pattern, which was read out, and notifies the abnormality detection position on said magnetic recording medium to said processor when the abnormality was detected; and
said processor registers said abnormality detection position, which was notified, as an unusable region.

2. The magnetic recording device according to claim 1, wherein
said microdefect detection pattern is written again with a phase shift on the same location on said magnetic recording medium.

3. The magnetic recording device according to claim 1, wherein
said processor weakens the degree of magnetization of the write section of said magnetic recording medium by adjusting a parameter of a write system of said read-write channel when said microdefect detection pattern is written.

4. The magnetic recording device according to claim 3, wherein
the parameter of said write system is a write current.

5. The magnetic recording device according to claim 3, wherein
the parameter of said write system is a write current overshoot.

6. The magnetic recording device according to claim 1, wherein
said processor lowers the frequency characteristic of said read-write channel by adjusting a parameter of a read system of said read-write channel when said microdefect detection pattern is read.

7. The magnetic recording device according to claim 6, wherein
the parameter of said read system is a cutoff frequency.

8. The magnetic recording device according to claim 6, wherein
the parameter of said read system is a boost.

9. The magnetic recording device according to claim 1, wherein
writing and reading of said microdefect detection pattern is carried out during a retry based on the error detection during reading or writing of the usual data.

10. The magnetic recording device according to claim 1, wherein
writing and reading of said microdefect detection pattern is carried out periodically.

11. A microdefect detection method in a magnetic recording device comprising
a magnetic recording medium;
a read-write channel for modulating write data, writing it on said magnetic recording medium, reading data from said magnetic recording medium, and demodulating said read data; and
a processor for supplying said write data to said read-write channel and being supplied with said read data from said read-write channel, said method comprising:
a write step of supplying a microdefect detection pattern having a first pattern for generating a consecutive magnetization inversion during writing and a second pattern for generating, during reading, a signal having a S/N ratio higher than the signal produced by said first pattern from said processor to said read-write channel, modulating said microdefect detection pattern, and writing it on said magnetic recording medium with said read-write channel;

a read step of reading said microdefect detection pattern, which was written, from said magnetic recording medium with said read-write channel;

a detection step of conducting abnormality detection of a signal corresponding to said microdefect detection pattern, which was read out, and notifying the abnormality detection position on said magnetic recording medium to said processor when the abnormality was detected with said read-write channel; and a registering step of registering with said processor said abnormality detection position, which was notified, as an unusable region.

12. The microdefect detection method according to claim 11, wherein said microdefect detection pattern is written again with a phase shift on the same location on said magnetic recording medium.

13. The microdefect detection method according to claim 11, wherein said processor weakens the degree of magnetization of the write section of said magnetic recording medium by adjusting a parameter of a write system of said read-write channel in said write step.

14. The microdefect detection method according to claim 13, wherein the parameter of said write system is a write current.

15. The microdefect detection method according to claim 13, wherein the parameter of said write system is a write current overshoot.

16. The microdefect detection method according to claim 11, wherein said processor lowers the frequency characteristic of said read-write channel by adjusting a parameter of a read system of said read-write channel in said read step.

17. The microdefect detection method according to claim 16, wherein the parameter of said read system is a cutoff frequency.

18. The microdefect detection method according to claim 16, wherein the parameter of said read system is a boost.

* * * * *